(12) United States Patent
Kliesch et al.

(10) Patent No.: US 7,833,618 B2
(45) Date of Patent: *Nov. 16, 2010

(54) MULTILAYER, WHITE, LASER-CUTTABLE AND LASER-INSCRIBABLE POLYESTER FILM

(75) Inventors: Holger Kliesch, Ginsheim-Gustavsburg (DE); Martin Jesberger, Mainz (DE); Bodo Kuhmann, Runkel (DE); Ingo Fischer, Heistenbach (DE); Cynthia Bennett, Alzey (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/930,379

(22) Filed: Oct. 31, 2007

(65) Prior Publication Data

US 2008/0107880 A1    May 8, 2008

(30) Foreign Application Priority Data

Nov. 2, 2006 (DE) .................. 10 2006 051 657

(51) Int. Cl.
*B32B 27/18* (2006.01)
*B32B 27/20* (2006.01)
*B32B 27/36* (2006.01)
*B29C 47/06* (2006.01)

(52) U.S. Cl. .................. 428/216; 428/212; 428/213; 428/323; 428/327; 428/328; 428/334; 428/335; 428/336; 428/337; 428/339; 428/402; 428/403; 428/407; 428/480; 428/910; 430/269; 430/346; 524/500; 524/497; 264/173.16

(58) Field of Classification Search .................. 428/480, 428/216, 212–213, 215, 323, 327–328, 334–337, 428/339, 402–403, 407, 910; 430/269, 346; 523/125; 524/495–500

See application file for complete search history.

(56) References Cited

U.S. PATENT DOCUMENTS

2005/0084693 A1 * 4/2005 LaBrec .................. 428/480

FOREIGN PATENT DOCUMENTS

| DE | 26 47 713 C2 | 4/1997 |
| EP | 0 645 747 A2 | 3/1995 |
| EP | 1 322 719 A | 7/2003 |
| EP | 1 322 719 B1 | 7/2003 |
| EP | 1 458 574 A1 | 7/2003 |
| EP | 1 905 585 A1 | 4/2008 |
| JP | 07 276575 | 10/1995 |
| JP | 2002-273832 * | 9/2002 |
| JP | 2004-575279 | 9/2002 |
| WO | WO 01/19612 A | 3/2001 |
| WO | WO 01/59745 A1 | 8/2001 |
| WO | WO 02/068192 A1 | 9/2002 |
| WO | WO2004/050766 A1 * | 6/2004 |

OTHER PUBLICATIONS

MacDonald et al. (edited by Brooks et al.). "PET Packaging Technology" (2002), Ch. 5, pp. 116-157.*
Zeus Technical Whitepaper. "UV Properties of Plastics: Transmission & Resistance", (2005), pp. 1-6.*

* cited by examiner

*Primary Examiner*—Patricia L Nordmeyer
*Assistant Examiner*—Prashant J Khatri
(74) *Attorney, Agent, or Firm*—ProPat, L.L.C.

(57) ABSTRACT

The invention relates to a white, coextruded, oriented polyester film with a base layer (B) and with at least one outer layer (A), where the base layer (B) includes a whitening pigment and/or void-forming incompatible polymer at a concentration of from 2 to 35% by weight (based on the weight of the base layer (B)), and from 0.01 to 15% by weight (likewise based on the weight of the base layer (B)) of a pigment that absorbs laser energy. The invention further relates to a process for production of these films and to their use as laser-cuttable and laser-inscribable film.

20 Claims, No Drawings

MULTILAYER, WHITE, LASER-CUTTABLE AND LASER-INSCRIBABLE POLYESTER FILM

CROSS-REFERENCE TO RELATED APPLICATIONS

This application claims priority to German Patent Application No. 10 2006 051 657.5 filed Nov. 2, 2006 which is hereby incorporated herein by reference in its entirety.

FIELD OF THE INVENTION

The invention relates to a laser-cuttable and laser-inscribable, at least two-layer, white, oriented polyester film, comprising a base layer (B) in which a polyester, a white pigment or incompatible polymer, and an additive that absorbs laser energy are present, and also comprising at least one outer layer (A). The invention moreover relates to a process for production of the film, and to the use of the film.

BACKGROUND OF THE INVENTION

White, oriented polyester films are known.

DE-C-26 47 713 describes a photographic, biaxially oriented, opaque layer substrate which is comprised of a linear polyester and comprises, as sole particulate pigment, an amount of from 5 to 50% by weight of barium sulfate. The average grain size of the barium sulfate particles is from 0.5 to 10 μm. The photographic, biaxially oriented, opaque layer substrate features particularly high whiteness and particularly high opacity, without any discoloration of the layer substrate due to additives present therein during production. It also has low density, good specular gloss, and low overall light permeability. However, the film lacks adequate laser cuttability and laser inscribability using lasers in the visible or near-infrared region.

EP-A-1 322 719 describes a laser-cuttable multilayer material which comprises a crosslinking nitrogen-containing compound. These materials have very poor or no orientability and exhibit high levels of yellow discoloration on recycling, and are therefore not very suitable for industrial-scale production of biaxially oriented films.

White and transparent polyester films generally have good cuttability by $CO_2$ lasers, which is to say that industrially useful cycle times are achieved in a usage example in which pieces of check-card dimensions are cut out from a film web. Markedly fewer cards per unit of time can be cut at conventional energy levels using the more familiar Nd:YAG lasers with wavelength around 1064 nm or frequency-doubled around 532 nm. Although white films have better laser-cuttability performance when compared with transparent polyester films, the cutting step is nevertheless often the rate-determining step in the process.

SUMMARY OF ADVANTAGEOUS EMBODIMENTS OF THE INVENTION

It was therefore an object of the present invention to provide an oriented polyester film which is white on at least one side and which features improved properties when compared with the white polyester films known in the prior art, in particular high whiteness on at least one side, low transparency, and improved laser cuttability and inscribability at laser wavelengths from 350 to 1500 nm.

DETAILED DESCRIPTION OF ADVANTAGEOUS EMBODIMENTS OF THE INVENTION

The invention achieves the object via provision of a white, coextruded, oriented polyester film with a base layer (B) and with at least one outer layer (A), where the base layer (B) comprises a whitening pigment and/or void-forming incompatible polymer at a concentration of from 2 to 35% by weight (based on the weight of the base layer (B)), and from 0.1 to 15% by weight of a pigment that absorbs laser energy.

The polymer of the base layer (B) and of the other layers of the film (ignoring any incompatible polymer present) is preferably comprised of at least 90% by weight of a thermoplastic polyester. Polyesters suitable for this are, inter alia, those comprised of ethylene glycol and terephthalic acid (=polyethylene terephthalate, PET), ethylene glycol and naphthalene-2,6-dicarboxylic acid (=polyethylene 2,6-naphthalate, PEN), 1,4-bishydroxy-methylcyclohexane and terephthalic acid (=poly-1,4-cyclohexanedimethylene terephthalate, PCDT), and also ethylene glycol, naphthalene-2,6-dicarboxylic acid and biphenyl-4,4'-di-carboxylic acid (=polyethylene 2,6-naphthalate bibenzoate, PENBB), and polyesters comprised of isophthalic acid and ethylene glycol, or else comprised of any desired mixture of the diols and carboxylic acids mentioned. Particular preference is given to polyesters comprised of at least 90 mol %, in particular at least 95 mol %, of ethylene glycol units and terephthalic acid units or of ethylene glycol units and naphthalene-2,6-dicarboxylic acid units. The remaining monomer units are derived from other aliphatic, cycloaliphatic, or aromatic diols and/or other dicarboxylic acids.

Examples of suitable other aliphatic diols are diethylene glycol, triethylene glycol, and aliphatic glycols of the general formula $HO-(CH_2)_n-OH$, where n is preferably smaller than 10. In order to achieve the abovementioned properties, in particular the low transparency and the desired whiteness of the film, the necessary pigments are incorporated into the base layer (B) and into any further layers present. It has proven advantageous here to use titanium dioxide, barium sulfate, zinc sulfide, zinc oxide, or—although less preferably—calcium carbonate at a suitable size and in a suitable concentration. It is preferable to use barium sulfate and it is particularly preferable to use titanium dioxide. The titanium dioxide can be either of rutile type or else of anatase type. If titanium dioxide is used, its grain size is advantageously from 0.05 to 2 μm, preferably from 0.1 to 0.5 μm. If calcium carbonate is used, its grain size is advantageously from 0.1 to 2.5 μm, but a preferred grain size is from 0.2 to 2.0 μm. If barium sulfate is used, its grain size is advantageously from 0.3 to 3.5 μm, preferably from 0.4 to 0.7 μm. The incorporated white pigments give the film a brilliant white appearance. In order to arrive at the desired whiteness (>60, preferably >75, and particularly preferably >90) and the desired low transparency (<60%, preferably <40%, and particularly preferably <20%), there must be a high level of filler in the base layer. The pigment concentration for achievement of the desired low transparency is from 2 to 35% by weight, preferably from 4 to 25% by weight, and particularly preferably from 6 to 18% by weight, based on the base layer of the film.

The white pigments mentioned can be replaced entirely or to some extent by incompatible polymers, such as polypropylene or cycloolefin copolymer (COC). Incompatible polymers are those which are immiscible with polyesters and therefore lead to haze (=whitening) on orientation. These polymers are described by way of example in EP-A-1 068 949. The amount of these polymers that can be added to the base layer is from 1 to 35% by weight, preferably from 2 to 25% by weight, and particularly preferably from 2.5 to 10% by weight. The entirety comprised of white pigment and of incompatible polymers is not permitted to exceed 35% by weight in the base layer and is not permitted to be less than 2% by weight. It is preferable that the entirety comprised of white pigment and of incompatible polymer in the base layer is from 4 to 25% by weight, particularly preferably from 6 to 18% by weight.

In a preferred embodiment, to enhance the whiteness, the outer layer (A), too, comprises a whitening pigment and/or void-forming incompatible polymer, appropriately in a concentration of from 0.05 to 18% by weight, preferably from 0.5 to 6% by weight and more preferably from 1 to 4% by weight (based on the weight of the outer layer (A)).

For a further increase in whiteness, suitable optical brighteners can be added to the outer layer(s) and/or—although less preferably—to the other layers. Examples of optical brighteners are HOSTALUX® KS or EASTOBRITE® OB-1.

The base layer of the film comprises, alongside the white pigment and, respectively, incompatible polymer, from 0.1 to 15% by weight, preferably from 1 to 5% by weight, and particularly preferably from 1.5 to 2.5% by weight, of a pigment that absorbs laser energy. This is preferably metal oxides or semimetal oxides, in particular oxides of the elements of the fifth period of the third, fourth, and fifth main group of the Periodic Table of the Elements, and particularly preferably mixed oxides from this group.

Examples of materials suitable for this purpose are antimony oxides, in particular $Sb_2O_3$, mixed oxides of $Sb_2O_3$ and tin oxide, e.g. Mark-it™ from Engelhard (USA), other doped tin oxides, such as mixed oxides of indium and tin (ITO), or else mixed tin oxides and fluorides, various copper salts, in particular copper phosphates, in particular mixed phosphates of copper and tin or of copper and antimony, and moreover molybdenum (IV) oxide, bismuth oxides, lanthanum borates, and manganese oxides, and also mixed oxides of copper and chromium, and mixtures of the abovementioned oxides, phosphates, etc. It has proven particularly advantageous to apply these metal salts not in the form of pure particles but rather merely as coatings on carrier materials, such as silicates, aluminum silicates, mica, calcium carbonate, or titanium dioxide, since the total content of heavy metals can thus be reduced to approximately the same absorption effect. Examples of these pigments are the coated mica pigments LAZERFLAIR® 820, 825 or MINATEC® from Merck, Darmstadt (DE). For these particles, too, the total weight of the particles is included in the abovementioned particularly advantageous pigment contents.

The particle size ($d_{50}$) of these particles that absorb laser light should be below 25 µm, preferably below 15 µm, and particularly preferably below 5 µm.

The absorption effect of the abovementioned pigments can be amplified via addition of black pigments (e.g. LAZERFLAIR® 835, $Fe_3O_4$ on mica) or carbon black. The content of these additives should, however, not exceed 0.75% by weight, and is preferably less than 0.2% by weight, and particularly preferably less than 0.02% by weight (based on the layer comprising these pigments).

The inventive film has at least two layers (base layer (B) and outer layer (A)), and preferably has three layers (base layer (B) and outer layers (A) and (C)), and, if appropriate, has a plurality of layers, with intermediate layers between outer layer (A)/(C) and base layer (B).

The outer layer (A) preferably comprises less than 0.5% by weight, and particularly preferably none at all, of the abovementioned laser-active pigments.

In the case of more than 0.5% by weight of laser-active pigment in the outer layer, there was surprisingly, as well as undesired discoloration of the cut edges on cutting, no improved inscription on laser inscription. In contrast, the inscription was more gray than black and harder to read. The same effect also resulted from an excessively thin outer layer; for this reason the thickness of the outer layer (A) should not be less than 0.4 µm, preferably being greater than 0.75 µm.

Any intermediate layers present preferably likewise comprise the abovementioned amounts, based on the weight of the layer, of laser-active pigments.

Any second outer layer (C) present can likewise comprise laser-active pigments, but preferably does not comprise these.

In one preferred embodiment, the sum total of white pigment and incompatible polymer in the outer layer C is 4 to 25% by weight and more preferably 6 to 18% by weight.

The layers can also comprise conventional additives, such as stabilizers and/or antiblocking agents. It is preferable to use these additives in the outer layers (layers (A) and (C)). These can be conventional additives, such as stabilizers (e.g. IRGANOX®) and/or antiblocking agents, such as $SiO_2$, kaolin, etc. They are usually added to the polymer or polymer mixture before melting begins. Examples of stabilizers used are phosphorus compounds, such as phosphoric acid or phosphoric esters.

Typical antiblocking agents are inorganic and/or organic particles, e.g. crystalline or amorphous silica, talc, magnesium carbonate, barium carbonate, calcium sulfate, lithium phosphate, calcium phosphate, magnesium phosphate, aluminum oxide, aluminum silicates, lithium fluoride, the calcium, barium, zinc, or manganese salts of the dicarboxylic acids used, titanium dioxide, kaolin, or crosslinked polystyrene particles, crosslinked PMMA particles, or crosslinked acrylate particles.

Other antiblocking agents that can be used are mixtures of two or more different antiblocking agents or mixtures of antiblocking agents of the same constitution but of different particle size. The antiblocking agents and the pigments for achievement of the desired whiteness and of the low transparency of the film can be added to the individual layers in the respective advantageous concentrations, e.g. in the form of glycolic dispersion during polycondensation or by way of masterbatches during extrusion.

In order to achieve good cuttability, it has proven advantageous that the thickness of the outer layer (A) is preferably below 20% of the total thickness of the film, particularly preferably below 12.5%, and ideally below 8.5%.

The total thickness of the inventive polyester film is from 10 to 500 µm, in particular from 15 to 200 µm, preferably from 20 to 100 µm, and the entirety comprised of base layer (B) and of any intermediate layers here makes up from 40 to 97% by weight of the total thickness of the film, preferably from 75 to 96% by weight, and particularly preferably from 85 to 95% by weight.

In one preferred embodiment, the longitudinal and transverse shrinkage of the inventive film at 200° C. is below 10%, preferably below 6%, and particularly preferably below 4%. The elongation (expansion) of this film at 100° C. is moreover less than 3%, preferably less than 1%, and particularly preferably less than 0.3%. This dimensional stability can be obtained, for example, via suitable relaxation of the film prior to wind-up (see description of process). In this embodiment, the dimensional stability of the film gives a clean cut in the cutting process, and no corrugation occurs, even close to edges. The abovementioned dimensional properties of the inventive film are particularly important because these affect the performance of the film during laser inscription or laser cutting. In the temperature range critical for this, the film is intended to have maximum dimensional stability. Temperatures of about 100° C. can be expected within the film in a certain vertical distance from the plane of laser inscription. Temperatures around 200° C. occur in the immediate environment of the laser cut. In both cases, the film is intended to be dimensionally stable; firstly it is intended to exhibit no excessive expansion in the lower temperature range (around 100° C.), and secondly it is intended to exhibit no excessive shrinkage in the upper temperature range (around 200° C.).

In one preferred embodiment, the longitudinal and transverse modulus of elasticity in the two directions within the film is greater than 3000 N/mm$^2$ and preferably greater than 3500 N/mm$^2$, and particularly preferably greater than 4100 N/mm$^2$. The longitudinal and transverse F5 values (force for 5% elongation) are preferably above 80 N/mm$^2$ and preferably above 90 N/mm$^2$. At values below these values, strain can occur in the film during laser cutting if the film is subjected to a tensile, flexural, or compressive force. These mechanical properties can be obtained, for example, via suitable biaxial stretching of the film (see description of process).

In another preferred embodiment, the film has been coated at least on one side with an adhesion promoter for printing inks. Examples of suitable coatings are acrylates or copolyesters with sulfoisophthalic acid contents >0.2% by weight.

Process

The polyester matrix polymers of the individual layers are prepared via polycondensation, either starting from dicarboxylic acids and ethylene glycol (known as the "PTA process") or else starting from the esters of the dicarboxylic acids, preferably the dimethyl esters, and ethylene glycol (known as the "DMT process"). The SV values of polyethylene terephthalates that can be used are preferably in the range from 600 to 900 and those of polyethylene 2,6-naphthalates that can be used are from about 500 to 800.

The white pigments, inorganic particles, or crosslinked organic particles can be added before preparation of the polyester is complete. To this end, the particles are dispersed in ethylene glycol, and if appropriate subjected to grinding, decanting, etc., and are added to the reactor either in the (trans)esterification step or in the polycondensation step. As a preferred alternative, a concentrated polyester masterbatch comprising particles of comprising additive can be prepared using a twin-screw extruder and diluted with particle-free polyester during film extrusion. A further possibility consists in adding particles and additives directly during film extrusion in a twin-screw extruder. The last two variants are particularly advantageous for addition of the pigments that absorb laser light, if these comprise antimony oxide or mixed oxides of antimony with other compounds, since these have catalytic activity in polyester preparation and make the polycondensation reaction difficult to control.

Non-crosslinked organic particles are either processed in a twin-screw extruder to give a masterbatch or added directly during film extrusion.

If single-screw extruders are used, it has then proven advantageous to predry the polyesters. If twin-screw extruders with devolatilizing section are used, the drying step can be omitted.

It has proven advantageous to use a twin-screw extruder to process the layer (B) comprising the laser-active material, since the drying step which is advantageous for processability in the case of single-screw extruders can lead to discoloration of the polymer. This applies particularly when regrind comprised of cut film and edge strips is introduced into the base layer, since this has undergone a number of previous extrusion steps. Dryer temperatures above 150° C. should always be avoided.

The polymer or the polymer mixture for the individual layers is first compressed and plastified in an extruder. The melts are then extruded through a coextrusion die to give flat melt films, laminated to one another, extruded through a flat-film die, and drawn off on a chill roll and on one or more take-off rolls, whereupon they cool and solidify.

The inventive film is biaxially oriented, i.e. biaxially stretched. The biaxial orientation of the film is most frequently carried out sequentially. This process preferably orients first longitudinally (i.e. in machine direction=MD) and then transversely (i.e. perpendicularly to machine direction=TD). The longitudinal orientation can be carried out with the aid of two rolls running at different speeds corresponding to the desired stretching ratio. An appropriate tenter frame is generally used for transverse orientation.

Simultaneous stretching of the film is also possible instead of sequential stretching, but is not necessary.

The temperature at which the stretching is carried out can vary relatively widely and depends on the properties desired in the film. The longitudinal stretching is generally carried out in the temperature range from 80 to 130° C. (heating temperatures from 80 to 130° C.) and the transverse stretching is generally carried out in the temperature range from 90° C. (start of stretching) to 140° C. (end of stretching). The longitudinal stretching ratio is in the range from 2.0:1 to 5.5:1, preferably from 2.2:1 to 5.0:1. The transverse stretching ratio is generally in range from 2.4:1 to 5.0:1, preferably from 2.6:1 to 4.5:1.

In order to achieve the desired transparencies and the desired whiteness, it has proven advantageous for the stretching temperature to be below 120° C. and preferably below 110° C. (both in MD and in TD).

Prior to transverse stretching, one or both surfaces of the film can be coated in-line by processes known per se. The in-line coating can, for example, lead to improved adhesion between a metal layer or a printing ink and the film, or to an improvement in antistatic performance, or in processing performance of the film. If the exterior coextruded layers comprise no inorganic particles for improvement of slip properties and winding properties, a coating comprising particles can be applied at this point.

In the heat-setting which follows, the film is kept for a period of from about 0.1 to 10 s under tension at a temperature of from 150 to 250° C. and transversely relaxed by at least 1%, preferably at least 3%, and particularly preferably at least 4%, in order to achieve the preferred values for shrinkage and for elongation. This relaxation preferably takes place in the temperature range from 150 to 190° C. It is preferable that <25%, and >5% of the total relaxation takes place within the first 25% of the relaxation time. Conventional wind-up of the film then follows.

It has been ensured that, in particular if a twin-screw extruder is used for the base layer (B), regrind can be reintroduced into the extrusion process during production of the film at a concentration of from 20 to 60% by weight, based on the total weight of the film, without any significant resultant adverse effect on the physical and optical properties of the film, this means that no discoloration occurs due to thermoabsorber and thermal stress.

The inventive film features good processability, distinctly better cutting performance and inscribability than commercially available white films using laser light in the wavelength range from 350 to 3000 nm, and high whiteness values, and also low transparency.

The following test methods were used to characterize the raw materials and the films:

Measurement of Median Diameter $d_{50}$

Median diameter $d_{50}$ is determined by means of a laser on a HORIBA® LA 500, by means of laser diffraction (examples of other test equipment being a Malvern Mastersizer or Sympathec Helos, which use the same measurement principle). For the test, the specimens are placed with water in a cell and this is then placed in the measurement equipment. A laser is used to scan the dispersion, and the particle size distribution is determined by comparing the signal with a calibration curve. The particle size distribution is characterized via two parameters, the median value $d_{50}$ (=a measure of the position of the average) and the scatter, referred to as SPAN98 (=measure of the scatter of particle diameter). The measurement procedure is automatic and also includes the mathematical determination of $d_{50}$. $d_{50}$ here is defined as determined from the (relative) cumulative particle size distribution curve: the desired $d_{50}$ is directly given on the abscissa axis by the intersection of the 50% ordinate value with the cumulative curve.

Primary Particle Size of Nanoparticles (e.g. Aerosil® and Nyacol®)

The average size of the primary particles is determined from transmission electron micrographs (TEM) of the product under study. If the specimen takes the form of film or plastics pellets, the TEM study is to be carried out on microtome sections.

Laser Markability

A VECTORMARK® VMc5 Nd:YO$_4$ inscription laser from Trumpf in Schramberg (1064 nm) was used to write test patterns onto the films with the following parameters:

| Power (P): | from 10 to 60% in 10% steps |
| Frequency: | from 10 to 60 kHz in 10 kHz steps |
| Speed: | 1200 mm/s |

Almost all samples are markable more or less efficiently under these conditions. For each sample, the grid field which is the best with regard to darkness and uniformity of the marking without having holes burnt through is selected. For each sample, the best field thus determined is then rated visually according to the criteria of color and surface quality. The marks 5 and A are the best and from 0 to 2 and D are unsatisfactory. A roughened surface (marks B and C) might be good for some applications; for others, it will be undesired.

| Mark | Color | Mark | Surface |
|---|---|---|---|
| 5 | black | A | smooth, continuous |
| 4 | dark gray | B | slightly roughened |
| 3 | mid gray | C | significantly roughened |
| 2 | light gray | D | great loss of thickness through ablation |
| 1 | very light gray | | |
| 0 | no darkening | | |

In addition, in some examples, gray shade images of photographs were marked with the VECTORMARK® VMc5 Nd:YVO$_4$ laser.

In some examples, further marking tests with two other lasers were investigated:
1. A frequency-doubled Nd:YAG laser (532 nm) from Rofin-Sinar Laser GmbH in Bergkirchen, model: PowerLine 20E SHG II,
2. Nd:YAG laser (1064 nm) from Trumpf in Schramberg, VECTORMARK® VMc3.

Transparency

Transparency is measured to ASTM D1033-77.

Whiteness

Whiteness is determined by the Berger method, the general procedure being that 20 pieces of film are mutually superposed. Whiteness is determined with the aid of an "ELREPHO" reflectance photometer from Zeiss, Oberkochem (DE), standard illuminant C, 2° standard observer. Whiteness W is defined as $$W=RY+3RZ-3RX$$

where RX, RY, and RZ are appropriate reflection factors using an X, Y, and Z color-measurement filler. A barium sulfate pressing is used as white standard (DIN 5033, part 9). A detailed description is given by way of example in Hansl Loos "Farbmessung" [Color measurement], Verlag Beruf und Schule, Itzehoe (1989).

SV Value (Standard Viscosity)

Standard viscosity SV (DCA) is measured by a method based on DIN 53 726 at a concentration of 1% by weight in dichloroacetic acid. The dimensionless SV value is determined as follows from the relative viscosity ($\eta_{rel}$);

$$SV=(\eta_{rel}-1)\cdot 1000$$

Intrinsic viscosity (IV) is correlated with standard viscosity as follows:

$$IV[\eta]=6.907\cdot 10^{-4} SV(DCA)+0.063096 \ [dl/g]$$

Mechanical Properties

Mechanical properties are determined by way of a tensile test using a method based on DIN EN ISO 572-1 and -3 on film strips of dimensions 100 mm×15 mm. The change in length is measured by way of a traversed-distance recorder. Modulus of elasticity is determined at a tensile-test speed of 10%/min as the slope between tensile strength 0.2 and 0.3. The σ5 value (force for 5% tensile strength) is measured at a tensile-test speed of 100%/min.

Layer Thicknesses

The film is embedded into a molding composition, and a microtome is used to cut through the film, the surface is etched with argon plasma, and the cut edge is inspected in a scanning electron microscope. The different pigmentation of the layers makes it easy to distinguish the layer thicknesses from one another and to measure these.

Shrinkage/Elongation

Heat-shrinkage (or elongation) is determined on square film samples with edge length 10 cm. The specimens are measured accurately (edge length $L_0$), heat-conditioned for 15 min at 200° C. (and, respectively, 100° C.) in a convection drying cabinet, and then accurately measured at room temperature (edge length L). Shrinkage or elongation is obtained from the following equation:

$$Shrinkage[\%]=100(L_0-L)/L_0$$

$$Elongation \ [\%]=100(L-L_0)/L_0$$

Laser-Cuttability

Laser-cuttability can be tested with any laser system suitable for laser-cutting with emission wavelength of from 500 to 3000 nm. It is preferable to use an Nd:YAG laser with 1064 nm emission wavelength. By way of example, the system used in EP-A-1 322 719 for cuttability measurement can be used. The laser is adjusted so that the speed is exactly that required for clean cutout of a rectangle whose edge lengths are 7×4 cm. Clean means that the rectangle has no remaining connection to the remainder of the film and can be removed without filamenting. The maximum speed is compared with the speed achieved with a commercially available white film of the same thickness (under otherwise identical conditions, e.g. separation, energy, frequency, etc,). An example of a commercially available white film of the same thickness is HOSTAPHAN® WDW or HOSTAPHAN® WO. If no film of the same thickness is obtainable, the stated process has to be used to produce a three-layer film with 7% of $TiO_2$ (particle size from 0.15 to 1.2 μm) which is to be used as comparison.

10 rectangles are cut out from different sections of film. If the speed achieved is 10% higher than for the comparative film, cutting performance is good; if the speed can be raised by more than 30%, cutting performance is very good.

The following laser system was used for the measurements below: Nd:YAG laser (1064 nm) from Trumpf in Schramberg, VECTORMARK® VMc3. HOSTAPHAN® WDW50 ($TiO_2$ filler) and HOSTAPHAN® WO 50 ($BaSO_4$ filler) were used as comparison. Thickness was 50 μm in every case.

EXAMPLES

Example 1 (Inventive)

3 polymer mixtures were melted at 290° C. in 3 twin-screw extruders:

1. 98.9% by weight of polyethylene terephthalate with SV value of 800, 0.1% by weight of $SiO_2$ (SILYSIA® 340 from Fuji Silysia, JP), and 1.0% by weight of titanium dioxide (HOMBITAN® LW-S-U from Sachtleben, DE) with median particle diameter $d_{50}$ of about 0.3 μm→layer A
2. 84% by weight of polyethylene terephthalate with SV value of 800 and 14% by weight of titanium dioxide (HOMBITAN® LW-S-U from Sachtleben, DE) with median particle diameter $d_{50}$ of about 0.3 μm, and 2% by weight of LAZERFLAIR® 820 (Merck KGaA, Darmstadt, DE)→layer B
3. 85.9% by weight of polyethylene terephthalate with SV value of 800, 0.1% by weight of $SiO_2$ (SILYSIA® 340 from Fuji Silysia, JP), and 14% by weight of titanium dioxide (HOMBITAN® LW-S-U from Sachtleben, DE) with median particle diameter $d_{50}$ of about 0.3 μm→layer C Titanium dioxide and LAZERFLAIR® were introduced into finished PET polymer by means of a twin-screw extruder. The $SiO_2$ particles were added before the end of polycondensation.

The polymer mixtures were combined in an adapter and, through a flat-film die, applied electrostatically to a chill roll temperature-controlled to 60° C. The prefilm was then longitudinally and then transversely stretched under the following conditions;

| Longitudinal stretching | Heating temperature | 75-115° C. |
|---|---|---|
| | Stretching temperature | 115° C. |
| | Longitudinal stretching ratio | 3.7 |
| Transverse stretching | Heating temperature | 100° C. |
| | Stretching temperature | 110° C. |
| | Transverse stretching ratio | 4.0 |
| Setting | Temperature | 237-150° C. |
| | Duration | 2 S |
| | Relaxation in TD at 200-150° C. | 7% |

The total thickness of the resultant film was 50 μm, and the thickness of both of the outer layers (A) and (C) was 4 μm. The whiteness of the film was 90, transparency was 19%, and modulus of elasticity in MD was 4510 $N/mm^2$ and in TD was 5105 $N/mm^2$, The F5 value in MD was 100 $N/mm^2$ and in TD was 102 $N/mm^2$, Shrinkage in MD at 200° C. was 2.7% and in TD was 0.1%. The cutting speed of the film was higher by 35% than for HOSTAPHAN® WO50 and was higher by 32% than that of HOSTAPHAN® WDW50. The color mark (after inscription of the A side) was 3 and the surface quality was C.

Example 2 (Inventive)

3 polymer mixtures were melted at 290° C. in 3 twin-screw extruders:

1. 99.7% by weight of polyethylene terephthalate with SV value of 800, 0.1% by weight of $SiO_2$ (SILYSIA® 320 from Fuji Silysia, JP), and 0.2% by weight of titanium dioxide (HOMBITAN® LW-S-U from Sachtleben, DE) with median particle diameter $d_{50}$ of about 0.3 μm→layer A
2. 91% by weight of polyethylene terephthalate with SV value of 800 and 8% by weight of titanium dioxide (HOMBITAN® LW-S-U from Sachtleben, DE) with median particle diameter $d_{50}$ of about 0.3 μm, and 1% by weight of NANO® ITO (primary particle size $d_{50}$ about 15 nm, particle size of agglomerates in film about 200 nm) from Nanogate Advanced Materials, Saarbrücken, DE→layer B
3. 91.9% by weight of polyethylene terephthalate with SV value of 800, 0.1% by weight of $SiO_2$ (SILYSIA® 320 from Fuji Silysia, JP), and 8% by weight of titanium dioxide (HOMBITAN® LW-S-U from Sachtleben, DE) with median particle diameter $d_{50}$ of about 0.3 μm→layer C Titanium dioxide and NANO® ITO were introduced into finished PET polymer by means of a twin-screw extruder. The $SiO_2$ particles were added before the end of polycondensation.

The polymer mixtures were combined in an adapter and, through a flat-film die, applied electrostatically to a chill roll temperature-controlled to 60° C. The prefilm was then longitudinally and then transversely stretched under the following conditions:

| Longitudinal stretching | Heating temperature | 75-115° C. |
|---|---|---|
| | Stretching temperature | 115° C. |
| | Longitudinal stretching ratio | 3.7 |

| | -continued | |
|---|---|---|
| Transverse stretching | Heating temperature | 100° C. |
| | Stretching temperature | 110° C. |
| | Transverse stretching ratio | 4.0 |
| Setting | Temperature | 237-150° C. |
| | Duration | 2 S |
| | Relaxation in TD at 200-150° C. | 7% |

The total thickness of the resultant film was 50 µm, and the thickness of both of the outer layers (A) and (C) was 3.5 µm. The whiteness of the film was 88, transparency was 29%, and modulus of elasticity in MD was 4632 N/mm² and in TD was 5210 N/mm², The F5 value in MD was 101 N/mm² and in TD was 106 N/mm². Shrinkage in MD at 200° C. was 2.2% and in TD was 0.1%. The cutting speed of the film was higher by 25% than for HOSTAPHAN® WO50 and was higher by 23% than that of HOSTAPHAN® WDW50. The color mark (after inscription of the A side) was 3 and the surface quality was C.

Comparative Example 1 (Non-Inventive)

3 polymer mixtures were melted at 290° C. in 3 twin-screw extruders:
1. 85% by weight of polyethylene terephthalate with SV value of 800 and isophthalic acid content of 18 mol %, 0.1% by weight of SiO₂ (SILYSIA® 320 from Fuji Silysia, JP), and 14.9% by weight of barium sulfate (BLANC FIXE® F from Sachtleben, DE) with median particle diameter d₅₀ of about 1 µm→layer A
2. 85% by weight of polyethylene terephthalate with SV value of 800 and 15% by weight of barium sulfate (BLANC FIXE® F from Sachtleben, DE) with median particle diameter d₅₀ of about 0.3 µm→layer B
3. 85% by weight of polyethylene terephthalate with SV value of 800, 0.1% by weight of SiO₂ (SILYSIA® 320 from Fuji Silysia, JP), and 14.9% by weight of barium sulfate (BLANC FIXE® F from Sachtleben, DE) with median particle diameter d₅₀ of about 1 µm→layer C The SiO₂ particles and the barium sulfate were added before the end of polycondensation.

The polymer mixtures were combined in an adapter and, through a flat-film die, applied electrostatically to a chill roll temperature-controlled to 60° C. The prefilm was then longitudinally and then transversely stretched under the following conditions:

| | | |
|---|---|---|
| Longitudinal stretching | Heating temperature | 75-107° C. |
| | Stretching temperature | 107° C. |
| | Longitudinal stretching ratio | 3.7 |
| Transverse stretching | Heating temperature | 100° C. |
| | Stretching temperature | 105° C. |
| | Transverse stretching ratio | 4.0 |
| Setting | Temperature | 237-150° C. |
| | Duration | 2 S |
| | Relaxation in TD at 200-150° C. | 7% |

The total thickness of the resultant film was 50 µm, and the thickness of both of the outer layers (A) and (C) was 4 µm. The whiteness of the film was 94, transparency was 22%, and modulus of elasticity in MD was 4100 N/mm² and in TD was 5085 N/mm². The F5 value in MD was 99 N/mm² and in TD was 103 N/mm². Shrinkage in MD at 200° C. was 2.7% and in TD was 0.3%. The cutting speed of the film was no higher than that of HOSTAPHAN® WO50 and was lower by 4% than that of HOSTAPHAN® WDW50. The color mark (after inscription of the A side) was 1 and the surface quality was D.

That which is claimed:

1. A white, coextruded, oriented laser-cuttable polyester film comprising a base layer (B) and at least one polyester outer layer (A), wherein the base layer (B) comprises a whitening pigment and/or void-forming incompatible polymer at a concentration of from 2 to 35% by weight, based on the weight of the base layer (B), and from 0.1 to 15% by weight, based on the weight of the base layer (B), of a pigment that absorbs laser energy and
    said outer layer (A) ranges in thickness from 0.4 to below 20 microns, and said outer layer (A) comprises less than 0.5% by weight of pigment that absorbs laser energy.

2. The polyester film as claimed in claim 1, wherein the outer layer (A) comprises a whitening pigment and/or void-forming incompatible polymer which is identical with or different from the whitening pigment and/or incompatible polymer in the base layer (B).

3. The polyester film as claimed in claim 1, wherein the whitening pigment is titanium dioxide, calcium carbonate, barium sulfate, zinc sulfide, zinc oxide, or a mixture comprised of one or more of these pigments.

4. The polyester film as claimed in claim 1, wherein the base layer (B) comprises a whitening pigment and void-forming incompatible polymer and the entire amount of white pigment and incompatible polymer in the base layer is not more than 35% by weight and is not less than 2% by weight.

5. The polyester film as claimed in claim 1, wherein the pigment that absorbs laser energy is in the form of coated particles, and the coating comprises a material that absorbs laser energy.

6. The polyester film as claimed in claim 1, wherein the outer layer (A) comprises less than 0.5% by weight of pigment that absorbs laser energy and from 0.05 to 18% by weight, based on the weight of layer (A) of whitening pigment and/or void-forming incompatible polymer.

7. The polyester film as claimed in claim 6, wherein the outer layer (A) comprises 0% by weight of pigment that absorbs laser energy.

8. The polyester film as claimed in claim 1, wherein said film exhibits a whiteness of greater than 60.

9. The polyester film as claimed in claim 1, wherein said film exhibits a transparency of less than 60%.

10. The polyester film as claimed in claim 1, wherein said film exhibits a longitudinal and transverse shrinkage at 200° C. of less than 10%.

11. The polyester film as claimed in claim 1, wherein said film exhibits an elongation or tensile strain at 100° C. of less than 3%.

12. The polyester film as claimed in claim 1, wherein said film exhibits a longitudinal and transverse modulus of elasticity of greater than 3000 N/mm².

13. The polyester film as claimed in claim 1, wherein said film exhibits longitudinal and transverse F5 values of greater than 80 N/mm².

14. A process for producing a polyester film as claimed in claim 1 comprising
    (i) compressing a polyester polymer or a polyester polymer mixture for the individual layers of the film in an extruder and plastifying the polymer or polymer mixture to form melts,
    (ii) shaping the melts in a coextrusion die to form flat melt films,
    (iii) mutually superposing and pressing the flat melt films through a flat-film die and (iv) drawing off the superposed and pressed flat melt films on a chill roll and on one or more take-off rolls to form a prefilm,
(v) biaxially stretching the prefilm,
(vi) setting the biaxially stretched prefilm, and
(vii) relaxing the set prefilm to form film,
wherein the polyester polymer of the base layer (B) comprises a whitening pigment and/or void-forming incompatible polymer at a concentration of from 2 to 35% by weight, based on the weight of the base layer (B), and of from 0.1 to 15% by weight, based on the weight of the base layer (B), of a pigment that absorbs laser energy.

15. Laser cuttable and laser-writable film comprising film as claimed in claim 1.

16. The polyester film as claimed in claim 1, wherein said film ranges in thickness from 10 to 100 microns.

17. The polyester film as claimed in claim 1, wherein said base layer (B) is formed from polyester selected from polyethylene terephthalate; polyethylene 2,6-naphthalate; polyethylene 2,6-naphthalate bibenzoate; polyethylene isophthalate or mixtures thereof and said outer layer (A) is formed from polyethylene terephthalate.

18. A white, coextruded, oriented laser-cuttable entirely polyester film comprising a base layer (B) and at least one outer layer (A), wherein the base layer (B) comprises a whitening pigment and/or void-forming incompatible polymer at a concentration of from 4 to 35% by weight, based on the weight of the base layer (B), and from 0.1 to 15% by weight, based on the weight of the base layer (B), of a pigment that absorbs laser energy,
wherein said outer layer (A) has a thickness ranging from 0.75 microns up to below 100 microns and comprises
(i) less than 0.5% by weight of pigment that absorbs laser energy and
(ii) from 0.05 to 4% by weight of a whitening pigment and/or void-forming incompatible polymer
said film exhibiting a longitudinal and transverse shrinkage at 200° C. of less than 6% and a longitudinal and transverse modulus of elasticity of greater than 3500 N/mm$^2$, and an expansion at 100° C. of less than 3%.

19. The polyester film as claimed in claim 1, wherein said film can be cut with a Nd:YAG laser with 1064 nm emission wavelength at speeds of from 10% to 35% higher than comparable white films.

20. The polyester film as claimed in claim 1, wherein said base layer (B) comprises a whitening pigment and/or void-forming incompatible polymer at a concentration of from 8 to 35% by weight, based on the weight of the base layer (B), and said film exhibits a longitudinal modulus of elasticity of greater than 3000 N/mm$^2$.

* * * * *